Patented Jan. 9, 1951

2,537,055

UNITED STATES PATENT OFFICE 2,537,055

AQUEOUS EMULSION PAINTS

Francis Patrick Hiron and Philip James Garner, Chester, England, assignors to Shell Development Company, San Francisco, Calif., a corporation of Delaware No Drawing. Application September 16, 1948, Serial No. 49,642. In Great Britain September 24, 1947

6 Claims. (Cl. 106—135)

This invention relates to surface coating compositions of the aqueous emulsion type and deals particularly with the manufacture of aqueous emulsion paints from naphthenic acids containing film-forming constituents derived from petroleum.

Aqueous emulsion paints which are essentially dispersions in water of pigments and film-forming material, for example, an alkyd resin or drying oil or the like, have been extensively used in preference to conventional paints having organic vehicles because of their greater ease of application and because they are less hazardous to health and comfort in use. An important object of the present invention is to provide improved aqueous emulsion paints which may be more cheaply manufactured than prior products of this type. A special object is to produce new aqueous emulsion paints utilizing certain petroleum refinery by-products. Another object is to produce novel aqueous emulsion paints which give surface coatings of good color and water resistance. Still another object is to provide an economical method of producing aqueous dispersions of pigments and film-forming materials. Further objects and advantages of the invention will be apparent from the following discussion of some of its more advantageous applications which will be recognized as representing only a few of its many important uses.

The invention is based upon the discovery that certain petroleum refinery by-products containing naphthenic acid salts together with other components can be used advantageously in the manufacture of aqueous emulsion paints which are economical to produce and have outstanding properties.

Lubricating oil fractions derived from a number of types of crude petroleum as, for example, certain Venezuelan, Trinidad, Californian, Borneo and Roumanian crude petroleum contain appreciable quantities of naphthenic acids which need to be removed when refining to many grades of lubricants. This removal can be effected by treating the lubricating oil fraction with a base, advantageously an alkali or alkaline earth metal oxide, hydroxide or carbonate, to neutralize the naphthenic acids present, followed by distillation to separate a naphthenic acid-free lubricating oil and to leave a residue. This residue, which may be more or less dark in color, comprises neutralized naphthenic acids, resinous bodies and some mineral oil. The utilization of such residues frequently presents a problem of some magnitude and in some instances it is known to treat the residues as waste by-products. It has been found that by proper treatment of these residues they may be made suitable for use in aqueous emulsion paints. The preferred method of treatment, according to the invention, is to mix the chosen naphthenate residue, if desired in solution in an organic solvent, with an aqueous solution of an inorganic acid, for example, sulfuric acid, phosphoric acid, hydrochloric acid, or the like, whereupon two phases are formed, and recover the oil phase from the aqueous phase and from any inorganic salts which may have been precipitated. The oil phase may then be washed with water to remove any excess inorganic acid. This acid treatment converts the naphthenates into free naphthenic acids and also removes some of the resinous matter present in the residue. The separate oil phase thus comprises a partially purified mixture of naphthenic acid still containing resinous bodies and mineral oil. It is not essential that the acid used in the aforementioned acid treatment be a pure acid. Thus, we have found that sulfuric acid or oleum sludge resulting from the acid refining of mineral oils can be used for the acid treatment of the residues.

Products obtainable by this process of acidification are hereinafter referred to as "acidified petroleum residues" and as used herein this expression is intended to cover only those products obtainable by an acidification as described above of the residues obtained from the redistillation of a lubricating oil distillate which contains naphthenic acids wholly or mainly in the form of their salts, preferably their alkali and/or alkaline earth metal salts.

These acidified petroleum residues contain bodies of unidentified constitution which possess film-forming properties and the resulting aqueous emulsion paints show excellent water resistance after brushing out. These products are distinguishable from the pure naphthenic acids or naphthenates of commerce by the presence therein of these film-forming constituents which effectively improve the properties of the paints made therewith. Moreover, it has unexpectedly been found that the dark color of the acidified petroleum residues does not adversely affect the color of the paints prepared therefrom.

The following is a brief description of one suitable method of preparing an acidified petroleum residue useful in the invention:

A dark solid by-product remaining as residue after the redistillation of a lime neutralized lubricating oil distillate containing naphthenic acids is dissolved in gasoline and treated during mechanical stirring with excess of 10 per cent aqueous sulfuric acid (calculated on the calcium content of the residue). The aqueous phase is separated and the oil phase washed with water to remove any excess sulfuric acid. Calcium sulfate is then removed from the oil phase by filtration and the gasoline removed by distillation leaving a dark viscous liquid containing naphthenic acids, resinous bodies and mineral oil. A similar product can be obtained starting with a soda neutralized lubricating oil distillate and the sulfuric acid may be replaced by sulfuric acid or oleum sludge resulting from the acid refining of mineral oils. The acidified petroleum residues produced in this way are dark viscous liquids.

Any naphthenic acid-containing pertoleum product or fraction thereof may be the source of the acidified pertoleum residue used, although products containing components boiling above about 200° C. at 0.5 mm. mercury pressure, and preferably in the lubricating oil boiling range, are preferred. As previously indicated, a wide variety of bases may be used for the neutralization of the naphthenic acids in the chosen starting material. Most preferably, a stoichiometric excess of base is employed. For the separation of the acidified petroleum residues from the neutralized naphthenic acid mixture, acid solutions having concentrations of about 10% or higher are suitable.

In the preparation of the aqueous emulsions which form the medium of the paints of the present invention, advantage may be taken of the emulsifying properties of the naphthenic acids present in the acidified petroleum residues as well as the film-forming properties of these residues. To this end it is preferable to employ residues which contain naphthenic acids having acid numbers less than 200, preferably acid numbers of the order of about 100 to 175, these acid numbers being the number of milligrams of potassium hydroxide which will neutralize the acids in a one-gram sample of the naphthenic acids, although it will be understood that acidified petroleum residues wherein the naphthenic acids are of higher acid number may also be used in the new aqueous emulsion paints of the invention. Emulsions of the acidified petroleum residues may be made by merely agitating them with water in presence of sufficient inorganic or organic base, for example, an alkali metal or ammonium hydroxide, morpholine or triethanolamine, to neutralize the naphthenic acids present and form water-soluble naphthenates. Substantially complete neutralization of the naphthenic acid is generally desirable, so that the base used for this purpose imparts to the paint medium two useful properties, namely, the capacity to form an emulsion and neutrality. In some cases an addition of any of the usual emulsifying agents such as potassium rosinate, alkyl aryl sulfonates, water-soluble salts of alkyl sulfuric acid esters, etc., may be made. By using oleum sludge instead of sulfuric acid in preparing the acidified petroleum residues, it is possible to provide additional emulsifying material in the paint medium since this oleum sludge frequently contains naphtha-sulfonates. A colloid mill may be used in the preparation of these emulsions.

One advantageous method of making aqueous emulsion paints according to the present invention includes the steps of making an aqueous emulsion medium containing acidified petroleum residues and mixing a pigment with this medium. More specifically, the preferred process of making aqueous emulsion paints according to the present invention includes the steps of preparing an aqueous emulsion medium by agitating acidified petroleum residues with water in the presence of sufficient basic material to neutralize the naphthenic acids present, and dispersing a pigment in this medium.

It is preferable in the preparation of these aqueous emulsion media to add an emulsion stabilizer, for example, glue, gelatin, casein, methyl cellulose, agar, carragheen moss or alginic acid or its salts, to the emulsion medium, and if desired a preservative such as phenol or the like may also be added. In preparing the aqueous emulsions of acidified petroleum residues, it is generally advantageous to use about 2.5 to about 3 parts by weight of water per part of acidified petroleum residue in the emulsion.

These emulsion media can be pigmented by any of the techniques known for the pigmenting of aqueous emulsion paints. It has been found advantageous to prepare a separate slurry of the pigment, for example, in an edge runner and to add to this slurry with continual stirring the aqueous emulsion of the acidified petroleum residue. It is sometimes advantageous to grind the pigment slurry into the aqueous emulsion. Wetting agents, for example, sodium salts of secondary alkyl sulfuric acid esters of 10 to 20 carbon atoms or the like, may be employed in the preparation of the pigment slurry which may, if desired, also contain one or more of the previously mentioned emulsion stabilizers. Any of the pigments, inorganic and organic, normally employed in the preparation of water paints and which are resistant to both alkali and acid may be used, as, for example, lithopone, titanium dioxide, yellow ochre, iron oxide, barium carbonate, whiting and kaolin. Furthermore, insecticidal and/or fungicidal properties may be imparted to the aqueous emulsion paints of the present invention by the dispersion of suitable insecticides and/or fungicides in either phase of the emulsions.

As a rule, pigment slurries containing about 50% to about 65% by weight of total solids are preferred, and the pigment slurry and aqueous emulsion of acidified petroleum residues are mixed in proportions such as to form an aqueous emulsion paint of about 45% to about 60% total solids concentration. Before brushing out, the paint can be diluted to a suitable consistency with water.

The following examples illustrate the present invention, all parts being parts by weight. The mixture of the aqueous emulsion medium with pigments is the same in all five of the following examples and the description of the mixed paints has therefore been summarized in the separate table which follows the examples and is to be considered as part of the description of each example.

*Example I.—Paint with aqueous emulsion medium containing ammonia*

70 parts of a 9 per cent aqueous glue solution containing .1 part of phenol are added at 40° C. to 50° C. to a mixture of 34 parts of acidified petroleum residues prepared as described above from a lime neutralized lubricating oil distillate, 25 parts of water and 4 parts of .880 ammonium hydroxide, and the whole stirred under a mechanical stirrer for about 15 minutes to form an aqueous emulsion medium.

*Example II.—Paint with aqueous emulsion medium containing sodium hydroxide*

The following ingredients:

| | Parts |
|---|---|
| Acidified petroleum residues as used in Example I | 34 |
| 9% aqueous glue solution | 70 |
| 8% aqueous NaOH | 27 | were mixed and stirred as in Example I.

*Example III.—Paint with aqueous emulsion medium containing triethanolamine*

The following ingredients:

| | Parts |
|---|---|
| Acidified petroleum residues as used in Example I | 34 |
| 9% aqueous glue solution | 70 |
| Triethanolamine | 9 |
| Water | 25 | were stirred and mixed as in Example I.

The glue solution used in preparing this emulsion medium was made by stirring glue in water at room temperature for 24 hours and contains 1% phenol (based on the weight of the glue) as a preservative.

*Example IV.—Paint with aqueous emulsion medium containing ammonia*

A casein solution was first prepared from the following ingredients:

| | Parts |
|---|---|
| Casein | 97 |
| Ammonia (0.88) | 18 |
| Water | 773 | which were gently stirred for 24 hours at room temperature and 1 gram of phenol was added as a preservative. The aqueous emulsion paint medium was then prepared by mixing and stirring the following ingredients in the manner indicated in Example I:

| | Parts |
|---|---|
| Acidified petroleum residues as used in Example I | 34 |
| Casein solution as prepared above | 70 |
| Ammonia (0.88) | 4 |
| Water | 30 |

*Example V.—Paint with aqueous emulsion medium containing ammonia*

A glue solution was first prepared by dissolving 70 parts of glue in 600 parts of water and stirring for 12 hours at room temperature. This solution was then mixed with 300 parts of the casein solution prepared as indicated in Example IV, and 1 gram of phenol was added as a preservative. The aqueous emulsion paint medium was then prepared by mixing and stirring the following ingredients as indicated in Example I:

| | Parts |
|---|---|
| Acidified petroleum residues as used in Example I | 34 |
| Mixture of glue and casein solutions | 70 |
| Ammonia (0.88) | 4 |
| Water | 28 |

*Table*

| Ingredients, Parts by wt. | Stone | Cream | Rose | Green |
|---|---|---|---|---|
| Emulsion | 134 | 67 | 134 | 134 |
| 9% Aqueous glue solution | 75 | 110 | 75 | 75 |
| Titanium dioxide | 115 | 115 | 57.5 | 100 |
| Witherite | 100 | 100 | 100 | 100 |
| Lithopone | | | 50 | |
| Chrome green | | | | 15 |
| Red oxide (iron) | | | 7.5 | |
| Water | 75 | 75 | 75 | 75 |

In the foregoing examples, light brown stable emulsion media are produced (before the pigments are added), and those containing ammonia are the lightest in color. It is, therefore, desirable to use an aqueous emulsion medium containing ammonia when preparing paints with light-colored pigments.

Pigments are prepared by mixing various constituents indicated in the table (less the emulsion) in an edge runner until a slurry is formed. The aqueous emulsion medium is then stirred into the pigment slurry to produce the aqueous emulsion paint.

In the foregoing examples, the substitution of up to about 20% by weight of a conventional aqueous emulsion paint base, for example, an alkyd resin, for a part of the acidified petroleum residue used, gives equally good results. Still other changes can be made in the aqueous emulsion paints of the invention, and it will be understood that the invention is not limited to the examples given by way of illustration nor by any theory suggested in explanation of the improved results which are obtained.

We claim as our invention:

1. An aqueous emulsion paint comprising an aqueous emulsion of a neutralized mixture of naphthenic acids and film-forming components obtained by acid treatment of the bottom product of the distillation of a lubricating oil in the presence of a base followed by removal of the acid, together with a dispersed pigment.

2. An aqueous emulsion paint comprising an aqueous emulsion of a neutralized mixture of substantially oil-free naphthenic acids and associated film-forming constituents from a naphthenic acid-containing petroleum fraction boiling above 200° C. at 0.5 mm. mercury pressure, together with a dispersed pigment.

3. An aqueous emulsion paint comprising an aqueous emulsion of a neutralized mixture of substantially oil-free naphthenic acids and associated film-forming constituents from a lubricating oil fraction of petroleum, together with a dispersed pigment.

4. A mixture of an aqueous dispersion of an ammonium hydroxide neutralized mixture of naphthenic acids and associated film-forming constituents obtained as an oily upper layer on acid treatment of the bottom product of distillation of a lubricating oil in the presence of a base and an aqueous dispersion of an inorganic pigment.

5. An aqueous dispersion comprising an ammonium hydroxide neutralized upper layer from the sulfuric acid treatment of the naphthenic acid-containing residue remaining after the distillation of lubricating oil in the presence of a base, an emulsifying agent, an emulsion stabilizer, barium carbonate and an inorganic colored pigment.

6. An aqueous emulsion paint comprising an aqueous emulsion of a neutralized mixture of substantially oil-free naphthenic acids having an acid number of about 100 to 175 and associated film-forming constituents from a naphthenic acid-containing petroleum fraction boiling above 200° C. at 0.5 mm. mercury pressure, together with a dispersed pigment, there being about 2.5 to about 3.5 parts by weight of water per part of said neutralized mixture and about 45% to about 60% of total solids in the paint.

FRANCIS PATRICK HIRON.
PHILIP JAMES GARNER.

REFERENCES CITED

The following references are of record in the file of this patent:

UNITED STATES PATENTS

| Number | Name | Date |
|---|---|---|
| 1,868,211 | Nobel | July 19, 1932 |
| 2,220,531 | Lazar | Nov. 5, 1940 |
| 2,279,387 | Cheetham et al. | Apr. 14, 1942 |
| 2,293,208 | Lazar et al. | Aug. 18, 1942 |
| 2,385,800 | Douty et al. | Oct. 2, 1945 |